United States Patent [19]
Cox et al.

[11] Patent Number: 5,915,339
[45] Date of Patent: Jun. 29, 1999

[54] SECTOR PLATE AND SEAL ARRANGEMENT FOR TRISECTOR AIR PREHEATER

[75] Inventors: William C. Cox, Hornell; Thomas Gary Mergler, Bolivar, both of N.Y.

[73] Assignee: ABB Air Preheater Inc., Wellsville, N.Y.

[21] Appl. No.: 08/496,734

[22] Filed: Jun. 29, 1995

[51] Int. Cl.⁶ .................................................. F22B 33/00
[52] U.S. Cl. .................................. 122/1 A; 122/DIG. 2; 165/8; 165/9
[58] Field of Search .............................. 122/1 A, DIG. 1, 122/DIG. 2; 110/254; 165/8, 9

[56] References Cited

U.S. PATENT DOCUMENTS

| | | |
|---|---|---|
| 2,899,179 | 8/1959 | Haussler ........................................ 165/9 |
| 5,137,078 | 8/1992 | Borowy ......................................... 165/9 |
| 5,234,048 | 8/1993 | Seike et al. .................................. 165/9 |
| 5,363,903 | 11/1994 | Hagar ............................................ 165/9 |
| 5,456,310 | 10/1995 | Brophy et al. ................................ 165/9 |
| 5,529,113 | 6/1996 | Borowy ......................................... 165/9 |

Primary Examiner—Teresa Walberg
Assistant Examiner—Jiping Lu
Attorney, Agent, or Firm—Alix, Yale & Ristas, LLP

[57] ABSTRACT

A trisector air preheater includes sector plates between the primary air sector and the flue gas sector and between the secondary air sector and the flue gas sector which are of a large size so as to provide double radial seals. However, the sector plate between the primary and secondary air sectors is small and provides only a single radial seal. The one smaller sector plate reduces the pressure drop through the air preheater while sacrificing increased leakage only between air sectors. The axial seal between the primary and secondary air sectors may be maintained at a double seal size.

2 Claims, 6 Drawing Sheets

SECTOR PLATE AND SEAL ARRANGEMENT FOR TRISECTOR AIR PREHEATER

BACKGROUND OF THE INVENTION

The present invention relates to trisector, rotary regenerative air preheaters employing double radial seals and more particularly to the arrangement and sizing of the sector plates which divided the preheater into the three sectors.

Pulverized coal firing is the most commonly used procedure for firing coal in large steam generators, such as utility steam generators. Pulverized coal firing normally utilizes air for drying, classification and transport of the coal in the pulverizer. The air to the pulverizer is referred to as primary air while the remaining combustion air is referred to as secondary air. It is normally required that the coal be dried before ignition can take place and this drying is accomplished by the use of hot primary air which then transports the dried pulverized coal to the furnace.

The trisector air preheater is used on large coal-fired boilers particularly where a cold primary air fan is desirable. The preheater is designed so that, by dividing the air-side of the preheater into two sectors, the higher pressure primary air may be heated along with the secondary air in a single air preheater.

It is well known to provide sealing means in air preheaters to prevent the mingling of the flue gas with the air. These may include axial seals around the outer periphery of the rotor between the rotor and the housing and radial seals which extend along the upper and lower edges of the radially extending partitions that form the compartments in the rotor. The radial sealing member along the edges of the partitions wipe against the sector plates which divide the air preheater into sectors for the gas and air. The engagement of these radial seals with the sector plates minimizes the leakage and the mixing of the gas and air.

In order to keep the leakage as low as practical, it is common to provide a double sealing arrangement. In this arrangement, the sector plates are equal in size to two rotor compartments so that the radial seals on two consecutive radially extending rotor compartment partitions (diaphragms) are in engagement with the sector plate at the same time. This contrasts with a single seal arrangement where the sector plates need only be equal in size to one compartment. The problem with a double seal arrangement is that the sector plates occupy or bock-off a significant percentage of the flow area through the air preheater. Each double seal sector plate blocks off twice as much flow area as a single seal sector plate. That means that the pressure drop through the air preheater is increased or that the size needs to be increased.

SUMMARY OF THE INVENTION

The present invention relates to a trisector air preheater which includes double radial seals between the gas and air sectors but only single radial seals between the primary and secondary air sectors. More particularly, the sector plates between the gas sector and the two air sectors are equal in size to two rotor compartments thereby providing double seals while the sector plate between the primary and secondary air sectors are only equal in size to one compartment thereby providing for a single seal.

DESCRIPTION OF THE PREFERRED EMBODIMENT

Figure 1:
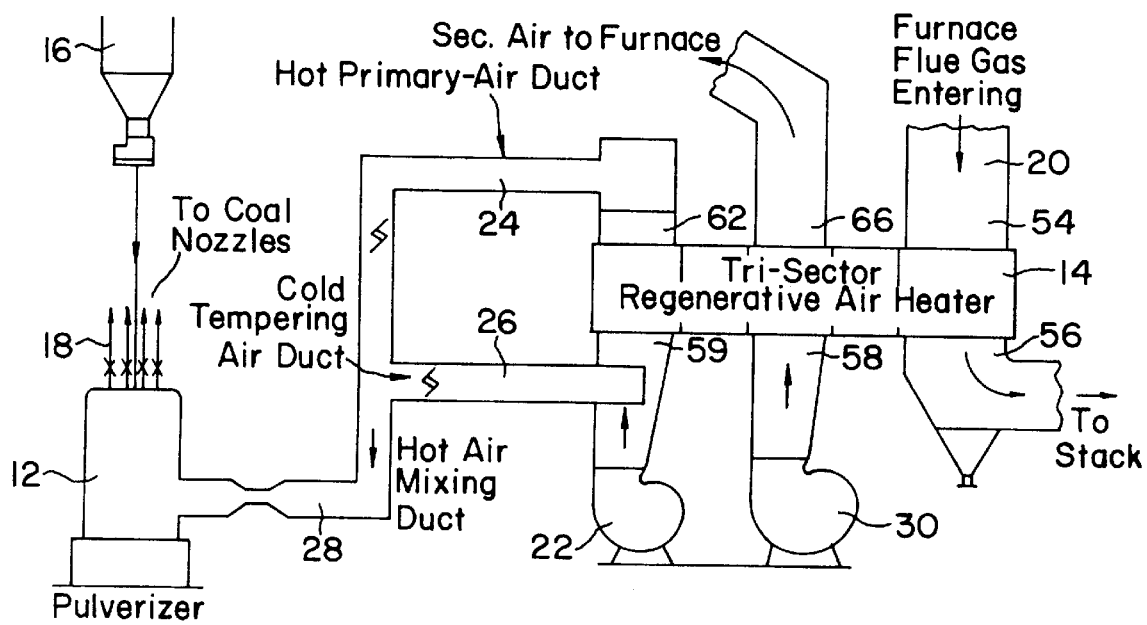
FIG. 1 is a diagrammatic representations of a pulverizer and trisector air preheater system.

FIG. 1 of the drawings shows the general arrangement of a coal pulverizer 12 in combination with a trisector air preheater 14. The coal is fed to the pulverizer 12 from the feed line 16 and the pulverized coal is fed to the coal nozzles of a steam generator (not shown) through the lines 18. The flue gas from the steam generator is fed to the air preheater 14 through the duct 20 after which the cooled flue gas is fed to the stack. The primary combustion air is blown into the air preheater 14 by the blower 22 and at least a part of this primary air is fed through the air preheater 14 in one of the sections where it is heated by the flue gas. The heated primary air in duct 24 may be mixed with unheated primary air from duct 26 to produce a final primary air stream in duct 28 which is fed to the pulverizer 12. This primary air dries the coal, assists in the classification of the coal fines in the pulverizer and transports the coal fines to the steam generator. The secondary combustion air is fed to another sector of the air preheater by the blower 30 where it is heated by the flue gas and then fed directly to the steam generator. This is all the conventional way of arranging and operating a trisector air preheater in combination with a coal pulverizer and steam generator.

Figure 2:
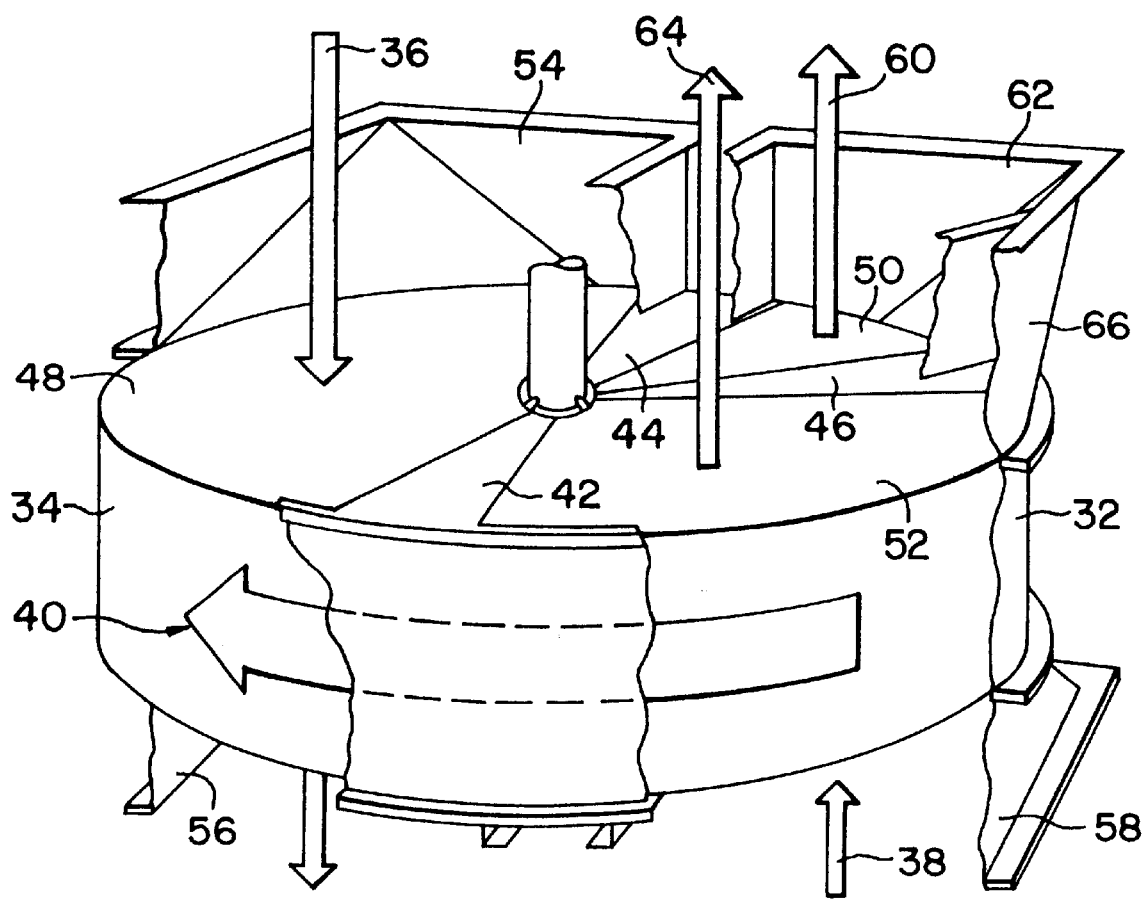
FIG. 2 is a general perspective view of a trisector rotary regenerative air preheater which is cut-away to show the upper sector plates.

FIG. 2 is a perspective view of an air preheater 14 constructed in accordance with the present invention. The air preheater 14 comprises a rotor housing 32 in which is mounted the rotor 34. As is conventional, the rotor contains a mass of heat exchange elements which absorb the heat from the flue gas stream 36 and transfer that heat to the incoming air stream 38. The rotation of the rotor 34 is indicated by the arrow 40. The internals of the rotor 34 are not shown in this FIG. 2 in order to more clearly show the invention but would include the radial partitions or diaphragms, which form the compartments for the heat exchange elements, and the radial seals which will be explained hereinafter.

The rotor housing 32 is divided into three sectors by the sector plates 42, 44, and 46. Corresponding sector plates are on the bottom side of the rotor 34. The three sectors are the flue gas sector 48, the primary air sector 50 and the secondary air sector 52. The hot flue gas 36 is directed into the sector 48 by the connecting duct 54 (partially broken away in the drawing), flows downwardly through the sector 48 and transfers heat to the heat transfer surface in the rotor compartments and then flows out through the duct connector 56. As this hot heat transfer surface then rotates through the primary and secondary air sectors 50 and 52, the heat is transferred to the air coming in through the secondary air inlet duct connector 58 and the primary air inlet duct connector 59 (see FIG. 1) to form a hot primary air stream 60 and in the duct connector section 62 and a hot secondary air stream 64 in the duct connector section 66.

Figure 3:
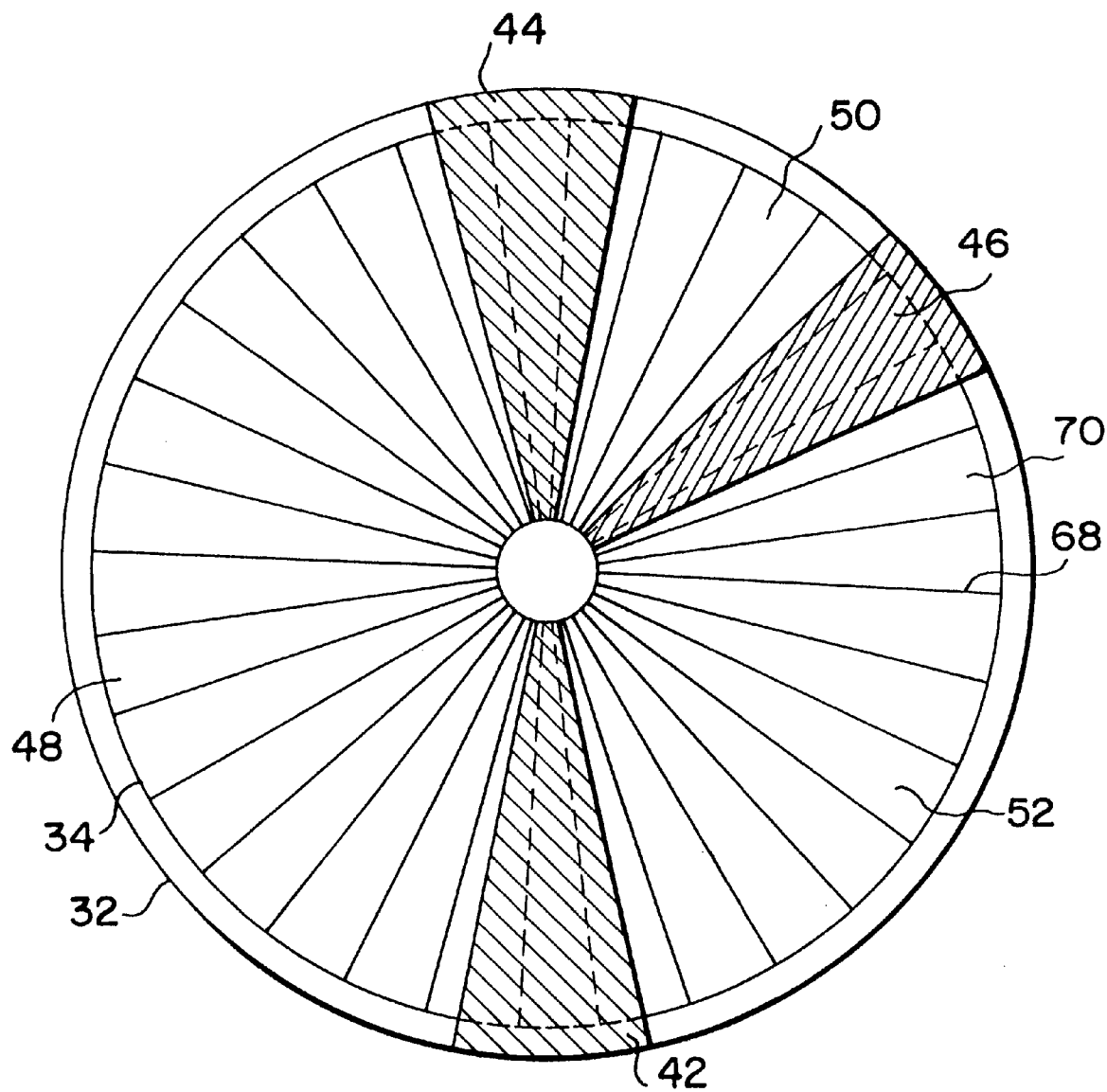
FIG. 3 is a simplified representation of a rotor of a trisector air preheater of the prior art having double radial seals.
Figure 4:
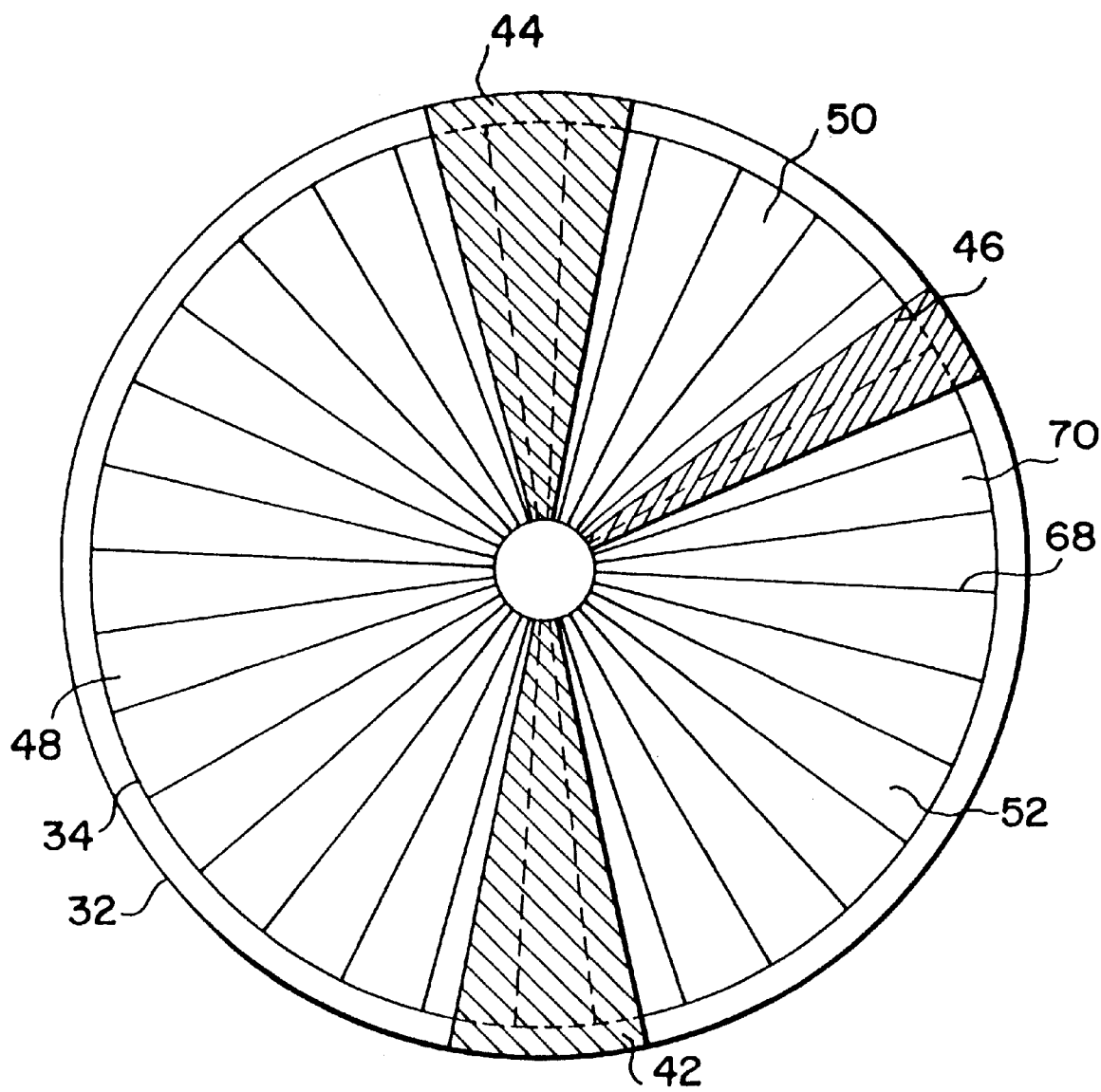
FIG. 4 is a representation similar to FIG. 3 but illustrates the sector plate arrangement of the present invention.
Figure 5:
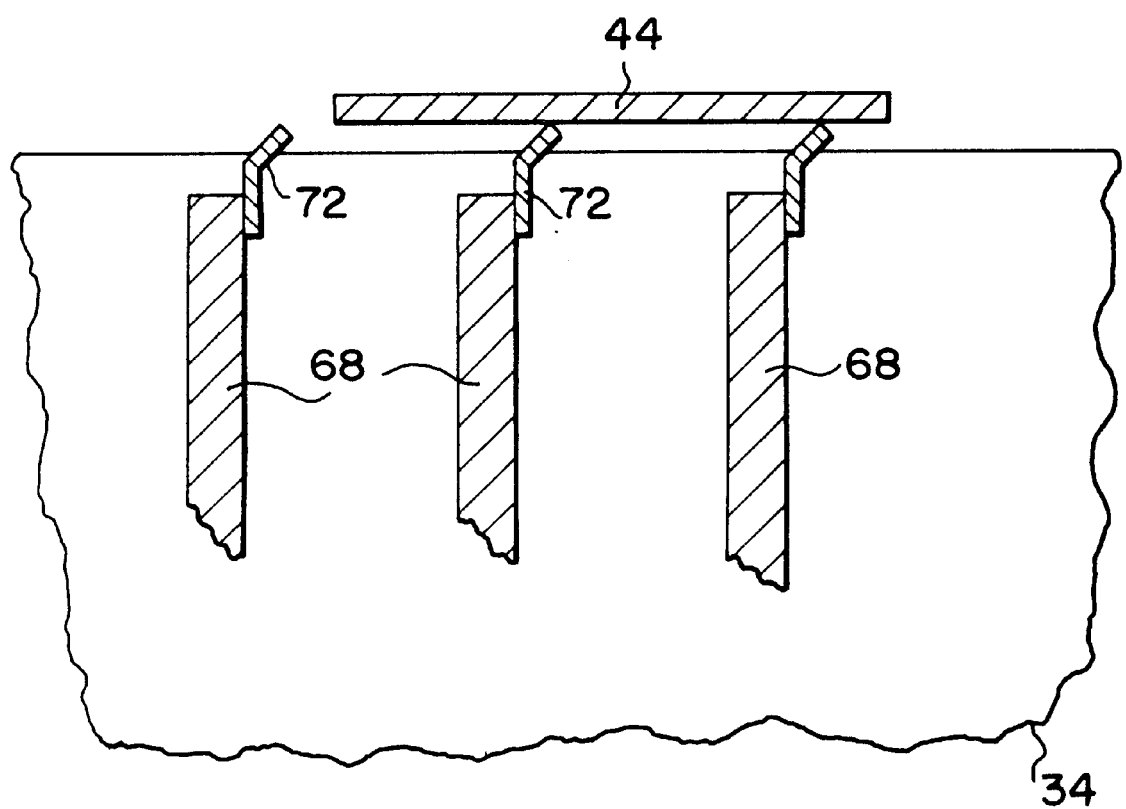
FIG. 5 is a cross section view of a portion of a rotor and sector plate illustrating a double seal arrangement.

FIGS. 3 and 4 are plan view representations of an air preheater rotor and housing illustrating the sector plates in relation to the rotor and radial seals. FIG. 3 illustrates the sector plates according to the prior art while FIG. 4 illustrates the present invention. These figures illustrate the sector plates in cross-section. The partitions or diaphragms 68 divide the rotor into the compartments 70 which contain the heat transfer surface which is usually arranged into modules adapted to fit into the compartments. Attached to the top and bottom edges of these diaphragms are the radial seals 72 which are shown in cross-section in FIG. 5. This FIG. 5 illustrates the double seal arrangement where the sector plate 44 is large enough so that it spans two compartments such that two radial seals 72 are always in engagement with the sector plate as the rotor rotates. This can also be seen in FIG. 3 where each of the sector plates 42, 44 and 46 of the prior art are of the same size and span two compartments. However, in accordance with the present invention as shown in FIG. 4, the sector plate 46 between the primary air sector 50 and the secondary air sector 52 is smaller and spans only one compartment such that only one radial seal 72 is in contact with the sector plate 46 at any particular time.

The reason for using a double radial seal arrangement is to reduce leakage between the sectors. When providing double radial seals on trisector air preheaters to reduce leakage, it is sometimes difficult to meet the requirements for low pressure drop for the primary and secondary air because of the flow that is blocked-off by the large size sector plates. In the present invention, one of the sector plates 46 is smaller thereby providing more air flow area through the rotor and less pressure drop. The primary concern with the leakage is between the air and the flue gas sides of the air preheater. Some increased leakage between the primary and second air can readily be tolerated. In this invention, the double seals between the flue gas sector and the two air sectors are maintained. As an example, a trisector air preheater with a 50° primary air sector would have a 25% to 30% reduction in the primary air pressure drop by using a 10° primary sector plate 46 instead of a 20° sector plate.

Figure 6:
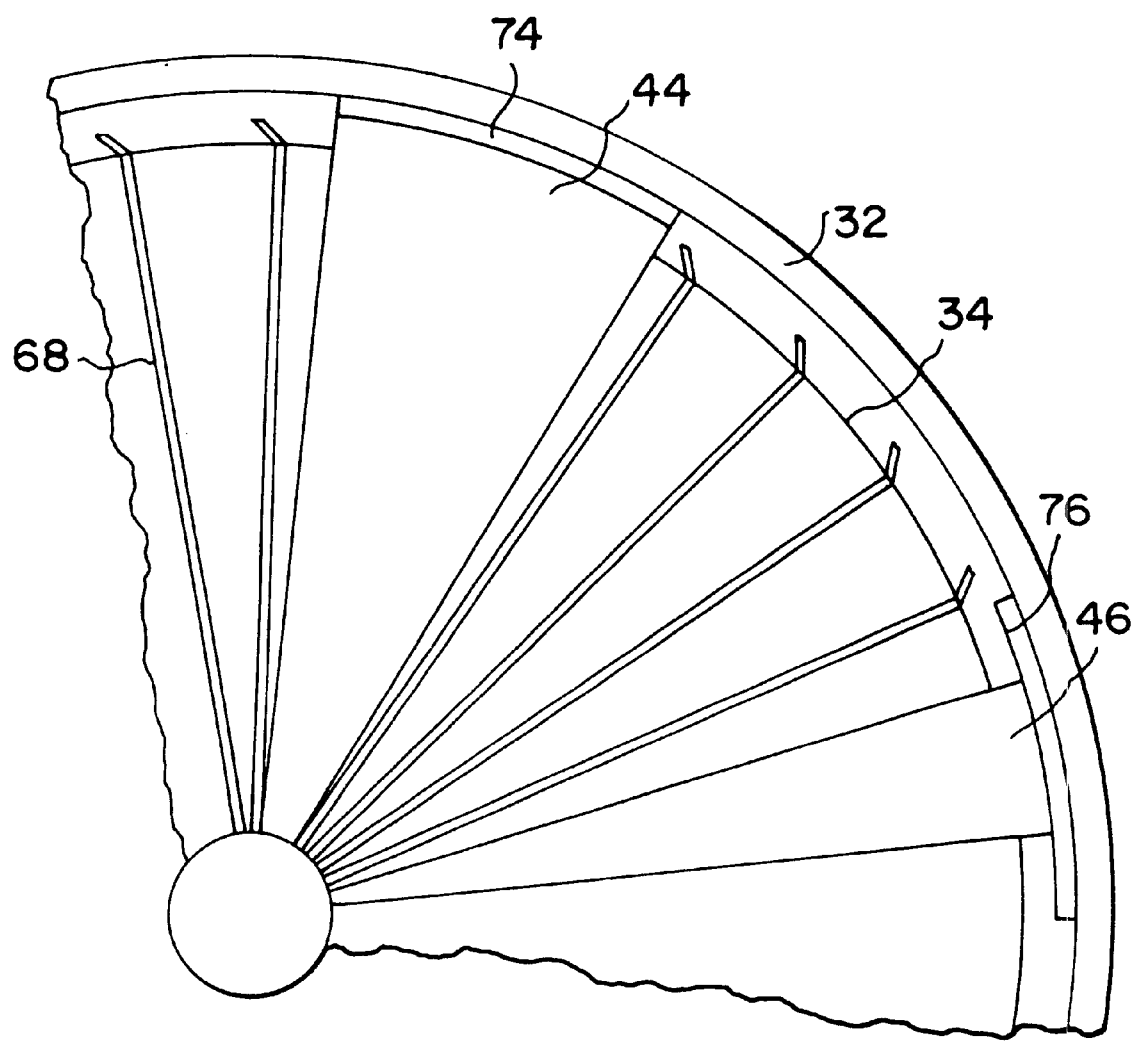
FIG. 6 is a plan view of a portion of an air preheater illustrating an axial seal arrangement.

Although leakage between the primary and secondary air sectors is not as critical as leakage between the air sectors and the flue gas sector, and even though the present invention will tend to increase the leakage between the primary and secondary air sectors, it is still desirable to keep this leakage to a minimum. One way that can be done is by maintaining the double axial seal between the primary and secondary air sectors instead of converting it to a single axial seal arrangement in conjunction with the conversion of the radial seal arrangement. This is illustrated in FIG. 6 which illustrates a plan view of a portion of an air preheater showing the housing 32, the rotor 34, the diaphragms 68 and the sector plates 44 and 46. Mounted on the inside of the housing 32 are the axial seal plates 74 and 76 (only two of the three axial seal plates are illustrated) which extend the full height of the rotor. Mounted on the rotor are the axial seals 78 which are the same or similar to the radial seals 72. These axial seals 78 engage the axial seal plates as the rotor revolves just as the radial seals engage the sector plates. While the sector plate 46 between the primary and secondary air sectors is reduced in size to span only one compartment according to the present invention, the corresponding axial seal plate 76 may be maintained at a double seal size as illustrated, so as to always span two axial seal members.

We claim:

1. A sealing arrangement for a trisector rotary regenerative air preheater including a rotor housing, a rotor located in said rotor housing having a plurality of radially extending diaphragms forming compartments in said rotor and having radial seals extending along the axial edges of said diaphragms and further including sector plates on both axial ends of said air preheater dividing said air preheater into a flue gas sector, a primary air sector and a secondary air sector, the improvement comprising sector plates between said flue gas sector and said primary air sectors and between said flue gas sector and said secondary air sector being of a size to be in engagement with two of said radial seals at all times and a sector plate between said primary and secondary air sectors being of a size to be in engagement with only one of said radial seals at any particular time.

2. A sealing arrangement as recited in claim 1 and further including axial seals spaced around the outside of said rotor and axial seal plates attached to the inside of said rotor housing between said sectors for engagement with said axial seals and wherein each of said axial seal plates is of a size to be in engagement with two of said axial seals at all times.

* * * * *